(No Model.) 3 Sheets—Sheet 3.
C. GARBE.
MAGAZINE GUN.
No. 315,609. Patented Apr. 14, 1885.
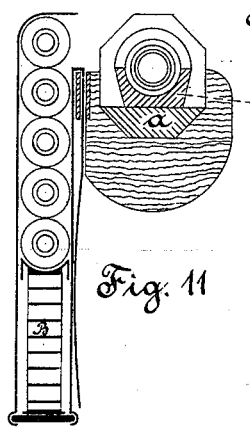
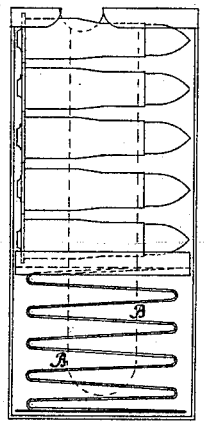
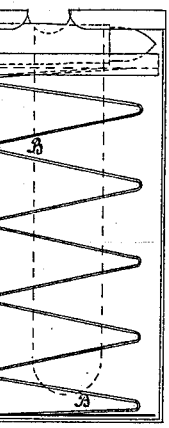
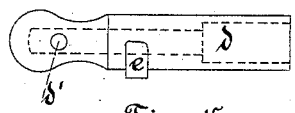
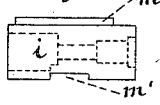
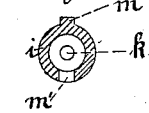
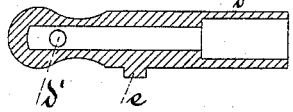
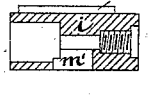
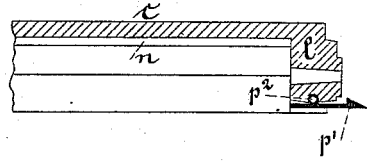
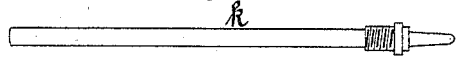
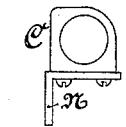
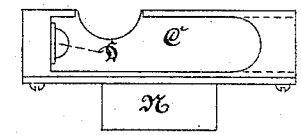
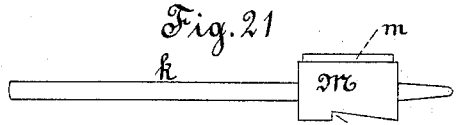
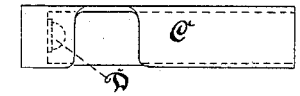
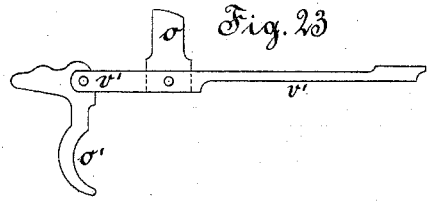
WITNESSES:
W. Bützke
P. Fischer
INVENTOR:
C. Garbe
BY W. H. Babcock
ATTORNEY

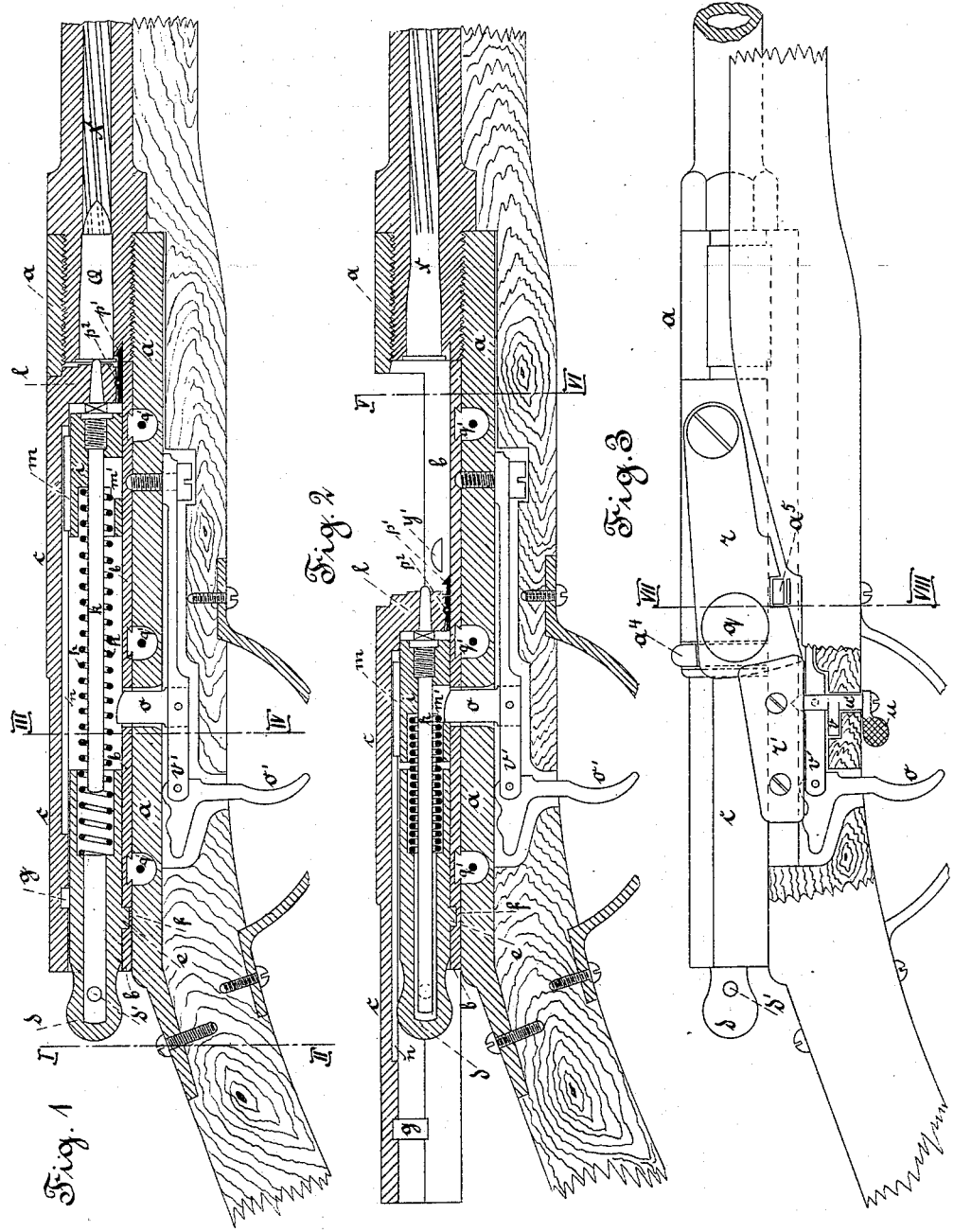

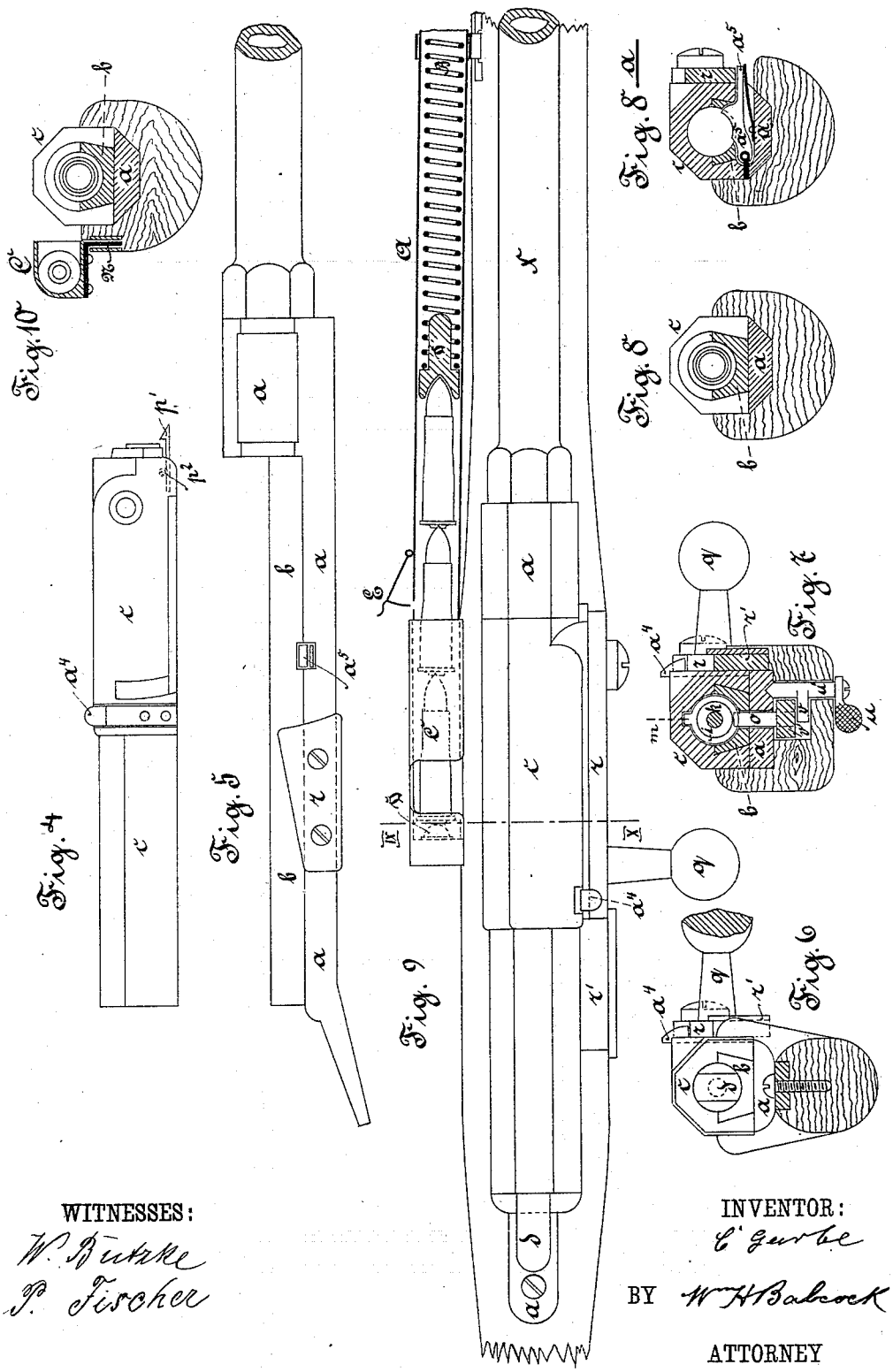

UNITED STATES PATENT OFFICE.

CONRAD GARBE, OF BERLIN, GERMANY.

MAGAZINE-GUN.

SPECIFICATION forming part of Letters Patent No. 315,609, dated April 14, 1885.

Application filed May 12, 1884. (No model.)

*To all whom it may concern:*

Be it known that I, C. GARBE, a subject of the King of Prussia, residing in Berlin, Prussia, Germay, have invented certain new and useful Improvements in Quick Loaders with Magazine Attachments; and I do hereby declare the following to be a full, clear, and exact description of the same, reference being had to the accompanying drawings, forming part of this specification.

This invention consists in certain improvements in the breech-loading mechanism, the magazine, the lock, and the barrel, all substantially as hereinafter more particularly set forth, and pointed out in the claims.

In the accompanying drawings, Figure 1 represents a longitudinal section of the rifle at the moment of firing. Fig. 2 represents a similar view, the parts being in position for loading. Fig. 3 represents a side elevation. Fig. 4 represents a detail side elevation of the chamber which contains the firing-pin. Fig. 5 represents a side view of the tube in which said chamber slides and the guide attached to the former. Fig. 6 represents a section on line I II through Fig. 1. Fig. 7 represents a section on line III IV through Fig. 2. Fig. 8 represents a section on line V VI through Fig. 2. Fig. $8^a$ represents a section on line VII VIII through Fig. 3. Fig. 9 represents a plan view of the rifle with the magazine in longitudinal section. Fig. 10 represents a section on line IX X through Fig. 9, the entire cross-section of the magazine being shown. Figs. 11, 12, and 13 represent a modification of the magazine, which is rectangular in form, allowing several to be packed together, the two latter views being at right angles to that shown in Fig. 11, and differing from one another only in the number of cartridges contained. Fig. 14 represents a longitudinal section of the cylinder which forms a seat for the firing-spring. Fig. 15 represents a side elevation of the same. Figs. 16, 17, 18, 19, 20, 21, 22, 23, 24, 25, and 26 show additional detail views.

The tube $a$ is secured, by means of dovetailed tail-shaped fastening-pieces $q'$, to the guide $b$, which, as may be seen in Figs. 6, 7, 8, is formed prismatically. On the guide $b$ the chamber $c$ can be shoved backward and forward.

In the interior of the chamber $c$ is the cylinder $d$, which is held by the semicircular shoulder $e$, which catches in a correspondingly-shaped groove, $f$.

For the purpose of taking the rifle to pieces quickly there is on the inside of the chamber $c$ a second groove, $g$, perfectly similar in size and shape to that of $f$, however, not directly above the latter, but, as may be seen in Fig. 1, placed more toward the lock, to prevent the cylinder $d$ turning when the rifle is used. When the rifle is being taken to pieces, the chamber is shoved back till the groove $g$ is directly above groove $f$, so that the shoulder $e$ of the cylinder $d$ can be turned out of the latter into the former, and the chamber $c$ can be drawn off from the guide $b$. The spring $h$ lies firmly against the cylinder $d$ and presses the hammer-bolt $k$, screwed into the lock $i$, continually onto the closure-piece $l$ or breech-block. The lock $i$ is, besides, provided on top with a shoulder, $m$, which slides in the longitudinal groove of the chamber $c$. On the lower side of the lock there is, again, a notch, $m'$, into which, when the chamber is drawn off, the trigger-spring nib $o$ snaps, by which means the lock is taken away too. On the lower side of the closure-piece $l$ is the hasp $p'$, movable on the pivot $p^2$.

If the gun has to be charged, as soon as the spring $a^4$, Figs. 3, 6, and 7, has been pressed back with the thumb, the knob $q$ is slightly raised till the lower edge of the side lap, $r$, is at an equal height with the counter-piece $r'$; the knob $q$, and together with it the chamber $c$, is then drawn back till the trigger-nib $o$ snaps into the opening $m'$, Figs 1 and 2, of the lock $i$, then the cartridge is laid into the open guide $b$ and the chamber is shoved forward again, whereby the closure-piece $l$ presses the cartridge Q firmly into the barrel. By pulling the trigger $o'$ the sinking of the trigger-nib $o$, fastened to spring $v'$, is effected, and lock $i$, and together with it the hammer-bolt $k$, are pressed forward by spring $h$, and the cartridge is caused to explode. If the chamber is drawn back again, then the spring fastened on the outside of the guide $b$, which catches with its rounded head $y'$ into a slit in the side of the guide $b$, throws the empty cartridge-case out. The firm closure of the chamber $c$ is brought about by the conical shape of the closure-piece $l$, which fits exactly into the cone of the tube. The rebound of the chamber $c$ is prevented by the counter-piece $r'$, against which the side lap, $r$, strikes, whereas spring $a^4$ hinders the latter from springing up.

In order to prevent the rifle discharging too quickly when being handled, there are two slide-stops attached. The first is under the trigger-spring $v'$—i. e., a slide-stop, $u$, in the butt of the rifle, which by a revolution of ninety degrees catches with its arm $v$ close under the spring $v'$, and thus prevents the sinking of the trigger-nib $o$, whereby the latter can therefore not be drawn out of the notch $m'$ of the lock $i$. A second slide-stop is to be found in spring $a^5$, Figs. 5 and $8^a$, under side lap, $r$, which comes into effect when the side lap, $r$, is not completely pressed down—that is to say, when the gun is not properly closed. The spring $a^5$, which lies right across the chamber, ranges forward in this case a little and blocks the way for the lock $i$, and not before the side lap, $r$, has pressed down the spring $a^5$ is the way clear and does the hammer-bolt reach the cartridge.

In order to observe with the chamber closed whether the gun is charged or not, the cylinder $d$ is provided with a bore-hole, $d'$, and if the hammer-bolt is seen in this opening it is a proof of the gun's being charged.

This rifle—represented in the Figs. 1 to 8—can be immediately changed into a quick loader by means of a magazine fixed into the butt.

The magazine consists of a tin case, A, into which the cartridges are laid, as shown in design, one under the other, and which holds up to eight cartridges. In the inside of it is a spiral spring, B, which with the one end strikes against the front closed end of the case A, and with the other end, by means of a cap, D, fastened to it, continually shoves the cartridges forward. The tin case A runs into a capsule, C, which has a side opening, Figs. 24, 25, 26, and is fixed into the butt close to the lock, and in such a manner that the cartridge can be pressed with the thumb of the right hand from the capsule into the chamber.

In order to prevent the cartridge when pressed by the spring B from striking violently against the end of the capsule C, the latter is provided with a buffer, D, made of leather, caoutchouc, &c. If the magazine is charged, but not appended for use, then the safety-hook E, Fig. 9, which is fastened to the case A, prevents the cartridges from springing out.

What I claim is—

1. In a breech-loading fire-arm, the combination of the spring-pressed hammer-bolt $k$ and the longitudinally-movable dovetailed chamber $c$, which incloses it, with the dovetailed guideway $b$ and the tube $a$, said chamber or casing running in contact with said guideway, substantially as set forth.

2. The combination of the hammer-bolt and its spring with the rotatable cylinder $d$, against which the rear end of said spring bears, and which is provided with a rib, $e$, the fixed guideway $b$, provided with a recess, $f$, for engaging with said rib, and the chamber $c$, provided with another recess similar to $f$, but arranged above said cylinder and normally farther forward than the last-mentioned recess, for the purpose set forth.

3. The combination of the hammer-bolt $k$ and its spring with the longitudinal groove or chamber $c$, in which it works, the lock $i$, carried by said bolt, having a longitudinal tongue, $m$, which fits the recess of said chamber, and also provided with a notch or recess, $m'$, on its under side, and a trigger provided with a nib or projection, $o$, which catches into said notch, substantially as set forth.

4. The extractor $p'$, in combination with the breech-block $l$, to which it is pivoted, the longitudinally-movable chamber $c$, of which said breech-block forms part, the guide $b$, and the spring $y'$, the latter operating to throw out the empty shells dislodged by said extractor, substantially as set forth.

5. In combination with the chamber $c$ and the side lap, $r$, attached thereto, the spring $a^5$, arranged to be pressed down by said side lap when the gun is properly closed, the spring-pressed hammer-bolt $k$, and the lock $i$, carried thereby, said lock being engaged and held by said spring $a^5$ whenever the gun is not properly closed.

6. The spring-pressed bolt and its lock $i$, in combination with the trigger having a nib engaging with said bolt, and the latch $u\ u'\ v$, arranged to be turned into position for preventing the withdrawal of said nib from said lock, substantially as set forth.

7. The combination of the movable chamber $c$, the side lap, $r$, attached thereto, the counter-piece $r'$, which limits the rebound of said side lap and chamber, and the spring $a^4$, which holds the latter parts down in their place, substantially as set forth.

8. The hollow cylinder $d$, provided with the opening $d'$ near its outer end for allowing inspection of its interior, in combination with the chamber $c$, which is closed at its rear end by said cylinder, the spring $h$, which is arranged within said chamber and bears against said cylinder, and the hammer-bolt $k$, which is actuated by said spring, substantially as set forth.

In testimony that I claim the foregoing as my invention I have signed my name in presence of two subscribing witnesses.

C. GARBE.

Witnesses:
JOHN R. ROSLYN,
WILHELM BUTZKE.